United States Patent

Tsunashima

[11] 4,183,625
[45] Jan. 15, 1980

[54] WIDE-ANGLE PHOTOGRAPHIC OBJECTIVE

[75] Inventor: Teruyoshi Tsunashima, Kawasaki, Japan

[73] Assignee: Nippon Kogaku K. K., Tokyo, Japan

[21] Appl. No.: 828,911

[22] Filed: Aug. 29, 1977

[30] Foreign Application Priority Data

Aug. 31, 1976 [JP] Japan ................. 51-103137

[51] Int. Cl.² .......................... G02B 13/04
[52] U.S. Cl. ...................... 350/207; 350/214
[58] Field of Search ................ 350/214, 207

[56] References Cited

U.S. PATENT DOCUMENTS

| 3,572,901 | 3/1971 | Mori | 350/214 |
| 3,832,035 | 8/1972 | Takahashi | 350/214 |
| 3,877,795 | 4/1975 | Yamashita | 350/214 |

Primary Examiner—Conrad J. Clark
Attorney, Agent, or Firm—Shapiro and Shapiro

[57] ABSTRACT

A wide-angle photographic objective comprises, in the order from the object side, a positive meniscus lens convex to the object side, a negative meniscus lens convex to the object side, a negative meniscus lens convex to the object side, a positive lens, a negative meniscus lens convex to the object side, a positive lens, a meniscus lens convex to the image side and comprising a biconcave lens and a biconvex lens cemented together, a meniscus lens convex to the image side and comprising a biconcave lens and a biconvex lens cemented together, and a positive lens.

8 Claims, 4 Drawing Figures

WIDE-ANGLE PHOTOGRAPHIC OBJECTIVE

BACKGROUND OF THE INVENTION

1. Field of the Invention

This invention relates to an inverted telephoto lens type or a retrofocus type wide-angle photographic objective.

2. Description of the Prior Art

In single lens reflex cameras there is a demand for lenses of small size and of camera bodies which are compact. Nevertheless, it has also become desirable to increase the relative aperture while covering a wider angle of view in order to increase the versatility of the photographic objectives. The attainment of such lenses has been difficult because of the problems encountered in the correction of the aberrations.

SUMMARY OF THE INVENTION

The primary object of the present invention is to provide a wide-angle photographic objective which affords small size coupled with large relative aperture, wide angle of view and good correction of the aberrations.

The wide-angle photographic objective according to the present invention is small in size while having an angle of view of 94° and a relative aperture of 1:2.8. More particularly, for use as the objective for a 35 mm single lens reflex camera, the filter diameter of the forward lens may be even smaller, on the order of 52 mm.

DESCRIPTION OF THE PREFERRED EMBODIMENTS

Figure 1:
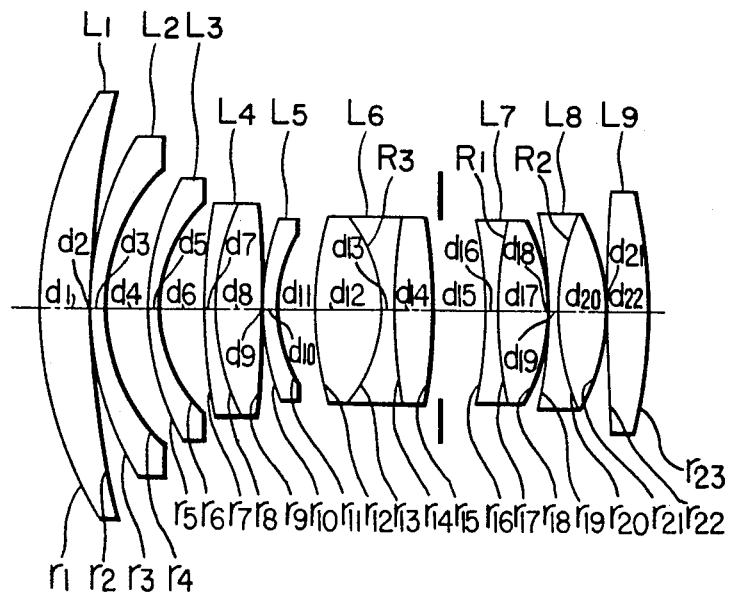
FIG. 1 illustrates a lens construction according to the invention.

The wide-angle photographic objective as shown in FIG. 1 comprises nine components. In the order from the object side, the objective comprises a first component L1 which is a positive meniscus lens convex to the object side, a second component L2 which is a negative meniscus lens convex to the object side, a third component L3 which is a negative meniscus lens also convex to the object side, a fourth component L4 which is a positive lens, a fifth component L5 which is a negative meniscus lens convex to the object side, a sixth component L6 which is a positive lens, a seventh component L7 which is a meniscus lens convex to the image side and comprising a biconcave lens and a biconvex cemented together, an eighth component L8 which is a meniscus lens also convex to the image side and comprising a biconcave lens and a biconvex lens cemented together, and a ninth component L9 which is a positive lens. Adjacent components are disposed with a predetermined air space therebetween, and a diaphragm is disposed between the sixth component L6 and the seventh component L7. The significant features of the photographic objective of the invention reside in the lens components subsequent to the diaphragm, particularly the seventh component which is a meniscus lens convex to the image side and comprising a concave and a convex lens cemented together, and the eighth component which is a meniscus lens similar in construction to the seventh component.

In greater detail and in accordance with the preferred form of the invention, when the curvature radius of that surface of a certain one of the lens components which faces the object side is Rf and the curvature radius of that surface of the same component which faces the image side is Rr, the shape factor (SF), if introduced as a value representing the shape of such lens component, is defined as $SF = (R_r + R_f)/(R_r - R_f)$. For the seventh and the eighth component each comprising a concave and a convex lens cemented together, let $SF_1$ and $SF_2$ designate the shape values, respectively, let $N_{1n}$ and $N_{2n}$ designate the refractive indices of the glass materials of the concave lenses forming the respective two components, and let $N_{1p}$ and $N_{2p}$ designate the refractive indices of the glass materials of the biconvex lenses forming the respective two components. Also, let $R_1$ and $R_2$ designate the curvature radii of the cemented surfaces of the respective two lens components, and f the total focal length of the entire system.

Then, these significant features or conditions may be expressed as follows:

$$-5.0 < SF_1 < -2.5 \quad (1)$$

$$-3.5 < SF_2 < -1.3 \quad (2)$$

$$N_{1n} > N_{1p} \quad (3)$$

$$0.7f < R_1 \quad (4)$$

$$N_{2n} > N_{2p} \quad (5)$$

$$0.6f < R_2 < 2f \quad (6)$$

Usually, reduction in size of a lens system necessarily results in the aggravation of various aberrations. However, by adopting a lens construction which includes the above-described conditions in the portion subsequent to the diaphragm space, it is now possible to adequately correct the various aberrations created in the portion of the lens system disposed forwardly of the diaphragm and to arrange the forward lens group more compactly than has heretofore been accomplished.

Each of the aforementioned conditions will hereinafter be discussed in detail. Conditions (1) and (2) define the shapes of the seventh component L7 and the eighth component L8 each comprising a doublet. Outside the ranges of these conditions, coma will be aggravated to induce curvature of the image plane; also, unbalanced coma will result from the image height. If the upper limits of these conditions are exceeded, distortion will be under-corrected, and while this might be corrected by increasing the center thickness or the air space of a particular lens component without affecting the other aberrations, the result is loss of compactness for the lens system.

Conditions (3) and (4) define the refractive indices of the glass materials on the opposite sides of the cemented surface of the seventh component L7 and the radius of curvature of this cemented surface. Condition (3) is essential because to depart therefrom will cause coma to be aggravated. It is usually the tendency of a cemented surface that as the difference in its refractive index is greater, the curvature radius of the cemented surface is greater to make the aberrations easier to correct. If selection of a glass material having a great difference in refractive index is allowed for the cemented surface of this component, it will be possible to provide a construction in which the curvature radius is infinitely great. On the other hand, if the difference in refractive index is small, the curvature radius of the cemented surface must be small.

Conditions (5) and (6) are similar in significance to conditions (3) and (4) but concerned with the eighth component L8 which comprises a doublet. Condition (5), like condition (3), also is essential in order that the cemented surface of this component may be effective. The above-described relationship between the cemented surface and the refractive indices holds true in this case as well. This component greatly affects coma and distortion in particular and plays an important role in the correction of these aberrations, imposing even stricter conditions than the seventh component. If the lower limit of condition (6) is exceeded, coma will be aggravated while distortion will be over-corrected. If the upper limit of this condition is exceeded, the symmetry of coma will be destroyed and distortion will be under-corrected. In any case, these aberrations may not be maintained well corrected by any other component.

By satisfying the above-described construction and conditions, there is achieved a wide-angle photographic objective having an angle of view of 94° and a relative aperture 1:2.8 and yet smaller in size than heretofore.

In a wide-angle photographic objective according to the present invention, it is further preferred that the following conditions be satisfied to enable the correction of aberrations in the entire system to be accomplished with greater ease. More specifically, the sixth component L6 is a triplet lens comprising, in the order from the object side, a positive lens, a negative lens and a positive lens. Preferably, the following conditions are satisfied:

$$N_{3p} > N_{3n} \quad (7)$$

$$-0.4f < R_3 < -0.8f \quad (8),$$

where $N_{3p}$ represents the refractive index of the glass material forming the positive lens nearer the object side, $N_{3n}$ the refractive index of the glass material forming the negative lens, and $R_3$ the curvature radius of the cemented surface of these two lenses.

Condition (7) is desirable to make the role of this component more effective, and condition (8) is particularly effective to correct spherical aberration and coma under the restriction of condition (7). Outside condition (8), spherical aberration cannot be maintained well and asymmetry of coma will be created. Of the two cemented surfaces of this component, the one between the positive lens nearer the image side and the negative lens is intended only for the correction of chromatic aberration and will be unnecessary if chromatic aberration can be sufficiently corrected by substituting a doublet for one of any other component.

The lens system of the invention enables the correction of aberration for close-up photography. This is accomplished by causing the lens groups behind the diaphragm to be moved as a unit in a direction to reduce the diaphragm space when the entire lens system is moved axially in accordance with a desired photographing magnification, thereby correcting for the curvature of the image plane during the short distance photography.

Numerical data of some embodiments of the present invention will be shown below, with the understanding that $r_1, r_2, r_3, \ldots, r_{23}$ represent the curvature radii of the successive lens surfaces in the order from the object side, $d_1, d_2, d_3, \ldots, d_{22}$ represent the center thicknesses or the air spaces between the respective lenses, $nd_1, nd_2, nd_3, \ldots, nd_{14}$ represent the refractive indices of the glass materials forming the respective lenses, and $vd_1, vd_2, vd_3, \ldots, vd_{14}$ represent the Abbe numbers of such glass materials.

EMBODIMENT 1

| | Total focal length f=100mm | | Relative aperature 1:2.8 | |
| --- | --- | --- | --- | --- |
| | | Angle of view 2ω = 94° | | |
| $r_1 =$ | 170.588 | $d_1 =$ 18.63 | $nd_1 = 1.60327$ | $vd_1 = 60.7$ |
| $r_2 =$ | 377.203 | $d_2 =$ 0.49 | | |
| $r_3 =$ | 145.875 | $d_3 =$ 4.41 | $nd_2 = 1.80518$ | $vd_2 = 25.5$ |
| $r_4 =$ | 62.500 | $d_4 =$ 17.16 | | |
| $r_5 =$ | 107.843 | $d_5 =$ 3.92 | $nd_3 = 1.78797$ | $vd_3 = 47.5$ |
| $r_6 =$ | 61.520 | $d_6 =$ 20.59 | | |
| $r_7 =$ | 369.304 | $d_7 =$ 4.41 | $nd_4 = 1.80186$ | $vd_4 = 44.4$ |
| $r_8 =$ | 107.843 | $d_8 =$ 19.61 | $nd_5 = 1.53246$ | $vd_5 = 46.0$ |
| $r_9 =$ | −606.387 | $d_9 =$ 0.49 | | |
| $r_{10} =$ | 134.804 | $d_{10} =$ 3.92 | $nd_6 = 1.74443$ | $vd_6 = 49.4$ |
| $r_{11} =$ | 63.461 | $d_{11} =$ 16.67 | | |
| $r_{12} =$ | 128.412 | $d_{12} =$ 29.90 | $nd_7 = 1.74950$ | $vd_7 = 35.0$ |
| $r_{13} =$ | −61.765 | $d_{13} =$ 3.92 | $nd_8 = 1.48749$ | $vd_8 = 70.0$ |
| $r_{14} =$ | 147.059 | $d_{14} =$ 10.73 | $nd_9 = 1.74077$ | $vd_9 = 27.7$ |
| $r_{15} =$ | −2237.872 | $d_{15} =$ 25.49 | | |
| $r_{16} =$ | −196.078 | $d_{16} =$ 4.41 | $nd_{10} = 1.79504$ | $vd_{10} = 28.4$ |
| $r_{17} =$ | 205.882 | $d_{17} =$ 19.61 | $nd_{11} = 1.51680$ | $vd_{11} = 64.2$ |
| $r_{18} =$ | −100.000 | $d_{18} =$ 0.49 | | |
| $r_{19} =$ | −237.142 | $d_{19} =$ 3.92 | $nd_{12} = 1.80537$ | $vd_{12} = 25.5$ |
| $r_{20} =$ | 99.020 | $d_{20} =$ 21.08 | $nh_{13} = 1.51680$ | $vd_{13} = 64.2$ |
| $r_{21} =$ | −91.313 | $d_{21} =$ 0.49 | | |
| $r_{22} =$ | 2450.980 | $d_{22} =$ 15.69 | $nd_{14} = 1.51823$ | $vd_{14} = 59.0$ |
| $r_{23} =$ | −145.800 | | | |

EMBODIMENT 2

Total focal length f=100mm  Relative aperature 1:2.8
Angle of view 2ω = 94°

| | | | | | | | |
|---|---|---|---|---|---|---|---|
| $r_1=$ | 166.667 | $d_1=$ | 19.12 | $n_1=1.60327$ | | $vd_1=60.7$ | |
| $r_2=$ | 355.034 | $d_2=$ | 0.49 | | | | |
| $r_3=$ | 147.059 | $d_3=$ | 4.90 | $n_2=1.80454$ | | $vd_2=39.5$ | |
| $r_4=$ | 59.804 | $d_4=$ | 17.16 | | | | |
| $r_5=$ | 102.941 | $d_5=$ | 3.92 | $n_2=1.80454$ | | $vd_2=39.5$ | |
| $r_6=$ | 60.294 | $d_6=$ | 19.61 | | | | |
| $r_7=$ | 352.446 | $d_7=$ | 4.41 | $n_4=1.80186$ | | $vd_4=44.4$ | |
| $r_8=$ | 96.314 | $d_8=$ | 19.61 | $n_5=1.59507$ | | $vd_5=35.6$ | |
| $r_9=$ | −606.387 | $d_9=$ | 0.49 | | | | |
| $r_{10}=$ | 121.569 | $d_{10}=$ | 3.92 | $n_6=1.77279$ | | $vd_6=49.4$ | |
| $r_{11}=$ | 63.725 | $d_{11}=$ | 16.67 | | | | |
| $r_{12}=$ | 137.760 | $d_{12}=$ | 29.90 | $n_7=1.77279$ | | $vd_7=49.4$ | |
| $r_{13}=$ | −56.618 | $d_{13}=$ | 3.92 | $n_8=1.52000$ | | $vd_8=70.1$ | |
| $r_{14}=$ | 281.863 | $d_{14}=$ | 12.25 | $n_9=1.74077$ | | $vd_9=27.7$ | |
| $r_{15}=$ | −755.642 | $d_{15}=$ | 25.98 | | | | |
| $r_{16}=$ | −196.275 | $d_{16}=$ | 4.41 | $n_{10}=1.79668$ | | $vd_{10}=45.4$ | |
| $r_{17}=$ | 230.392 | $d_{17}=$ | 19.61 | $n_{11}=1.51714$ | | $vd_{11}=64.2$ | |
| $r_{18}=$ | −101.407 | $d_{13}=$ | 0.49 | | | | |
| $r_{19}=$ | −235.294 | $d_{19}=$ | 3.92 | $n_{12}=1.80537$ | | $vd_{12}=25.5$ | |
| $r_{20}=$ | 105.779 | $d_{20}=$ | 22.06 | $n_{13}=1.50153$ | | $vd_{13}=56.5$ | |
| $r_{21}=$ | −89.706 | $d_{21}=$ | 0.49 | | | | |
| $r_{22}=$ | 1960.784 | $d_{22}=$ | 15.69 | $n_{14}=1058913$ | | $vd_{14}=61.2$ | |
| $r_{23}=$ | −169.466 | | | | | | |

EMBODIMENT 3

Total focal length f=100mm  Relative aperature 1:2.8
Angle of view 2ω = 94°

| | | | | | | |
|---|---|---|---|---|---|---|
| $r_1=$ | 173.824 | $d_1=$ | 13.63 | $n_1=1.60311$ | $vd_1=60.7$ | |
| $r_2=$ | 406.863 | $d_2=$ | 0.49 | | | |
| $r_3=$ | 147.794 | $d_3=$ | 4.41 | $n_2=1.79877$ | $vd_2=44.3$ | |
| $r_4=$ | 62.500 | $d_4=$ | 17.16 | | | |
| $r_5=$ | 107.843 | $d_5=$ | 3.92 | $n_3=1.78797$ | $vd_3=47.5$ | |
| $r_6=$ | 56.373 | $d_6=$ | 20.59 | | | |
| $r_7=$ | 267.745 | $d_7=$ | 4.41 | $n_4=1.79877$ | $vd_4=44.3$ | |
| $r_8=$ | 107.843 | $d_8=$ | 19.61 | $n_5=1.53256$ | $vd_5=46.0$ | |
| $r_9=$ | −606.387 | $d_9=$ | 0.49 | | | |
| $r_{10}=$ | 116.667 | $d_{10}=$ | 3.92 | $n_6=1.73350$ | $vd_6=51.0$ | |
| $r_{11}=$ | 61.814 | $d_{11}=$ | 17.16 | | | |
| $r_{12}=$ | 136.569 | $d_{12}=$ | 29.90 | $n_7=1.74400$ | $vd_7=45.0$ | |
| $r_{13}=$ | −53.922 | $d_{13}=$ | 3.92 | $n_8=1.51680$ | $vd_8=64.2$ | |
| $r_{14}=$ | 294.118 | $d_{14}=$ | 10.78 | $n_9=1.62588$ | $vd_9=35.6$ | |
| $r_{15}=$ | −357.059 | $d_{15}=$ | 25.98 | | | |
| $r_{16}=$ | −195.108 | $d_{16}=$ | 4.41 | $n_{10}=1.78797$ | $vd_{10}=47.5$ | |
| $r_{17}=$ | 215.608 | $d_{17}=$ | 19.61 | $n_{11}=1.51680$ | $vd_{11}=64.2$ | |
| $r_{18}=$ | −100.000 | $d_{18}=$ | 0.49 | | | |
| $r_{19}=$ | −237.142 | $d_{19}=$ | 3.92 | $n_{12}=1.80518$ | $vd_{12}=25.5$ | |
| $r_{20}=$ | 104.588 | $d_{20}=$ | 21.08 | $n_{13}=1.50137$ | $vd_{13}=56.5$ | |
| $r_{21}=$ | −90.907 | $d_{21}=$ | 0.49 | | | |
| $r_{22}=$ | 4411.765 | $d_{22}=$ | 15.69 | $n_{14}=1.62299$ | $vd_{14}=58.1$ | |
| $r_{22}=$ | −177.897 | | | | | |

Figure 2A:
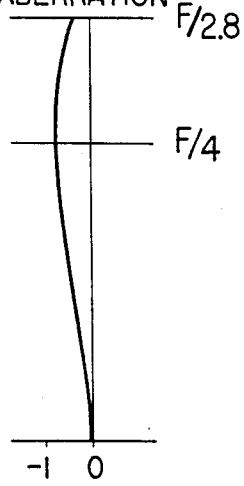
FIGS. 2A, 2B and 2C are graphs illustrating the spherical aberration, astigmatism and distortion of the third embodiment of the invention, the values of the various aberrations being for an objective where f=100 mm.
Figure 2B:
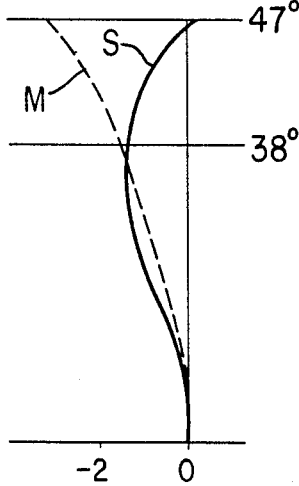
Figure 2C:
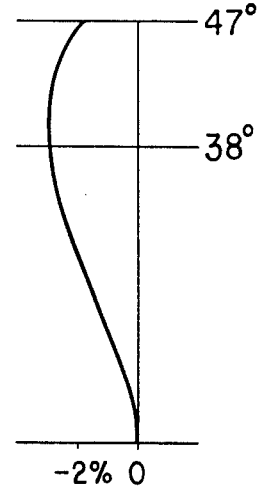

The lens construction of each embodiment has been described previously and typically may be represented by the lens construction of the first embodiment which is shown in FIG. 1. To illustrate the aberrations in the wide-angle photographic objective of the present invention, FIGS. 2A, 2B and 2C illustrate the various aberrations for the third embodiment. It will be seen that the photographic objective of the present invention is small in size while having an angle of view of 94° and a relative aperture of 1:2.8 and yet maintains good conditions of aberrations.

It is believed that the advantages and improved results afforded by the wide angle photographic objectives of the invention will be apparent from the foregoing detailed description of preferred embodiments thereof. Various modifications and changes may be made without departing from the spirit and scope of the invention as sought to be defined in the following claims.

I claim:

1. A wide-angle photographic objective comprising, in the order from the object side:
   a first component which is a positive meniscus lens convex to the object side;
   a second component which is a negative meniscus lens convex to the object side;
   a third component which is a negative meniscus lens convex to the object side;
   a fourth component which is a positive lens;
   a fifth component which is a negative meniscus lens convex to the object side;
   a sixth component which is a positive lens;
   a seventh component which is a meniscus lens convex to the image side and comprising a biconcave lens and a biconvex lens cemented together;
   an eighth component which is a meniscus lens convex to the image side and comprising a biconcave lens and a biconvex lens cemented together; and a ninth component which is a positive lens.

2. A wide-angle photographic objective according to claim 1, wherein said sixth component has at least one cemented surface of a positive and a negative lens, said cemented surface being convex to the image side.

3. A wide-angle photographic objective according to claim 1, wherein the numerical values of the radii $r_1$ to $r_{23}$ and of the thickness and separations $d_1$ to $d_{22}$, the refractive indices nd and the Abbe numbers $\nu d$ of the respective components are substantially as follows:

| Total focal length f=100mm Relative aperature 1:2.8 Angle of view 2ω = 94° | | | | | | | |
|---|---|---|---|---|---|---|---|
| $r_1=$ | 170.588 | $d_1=$ | 18.63 | $nd_1=1.60327$ | $\nu d_1=60.7$ |
| $r_2=$ | 377.203 | $d_2=$ | 0.49 | | |
| $r_3=$ | 145.875 | $d_3=$ | 4.41 | $nd_2=1.80518$ | $\nu d_2=25.5$ |
| $r_4=$ | 62.500 | $d_4=$ | 17.16 | | |
| $r_5=$ | 107.843 | $d_5=$ | 3.92 | $nd_3=1.78797$ | $\nu d_3=47.5$ |
| $r_6=$ | 61.520 | $d_6=$ | 20.59 | | |
| $r_7=$ | 369.304 | $d_7=$ | 4.41 | $nd_4=1.80186$ | $\nu d_4=44.4$ |
| $r_8=$ | 107.843 | $d_8=$ | 19.61 | $nd_5=1.53246$ | $\nu d_5=46.0$ |
| $r_9=$ | −606.387 | $d_9=$ | 0.49 | | |
| $r_{10}=$ | 134.804 | $d_{10}=$ | 3.92 | $nd_6=1.74443$ | $\nu d_6=49.4$ |
| $r_{11}=$ | 63.461 | $d_{11}=$ | 16.67 | | |
| $r_{12}=$ | 128.412 | $d_{12}=$ | 29.90 | $nd_7=1.74950$ | $\nu d_7=35.0$ |
| $r_{13}=$ | −61.765 | $d_{13}=$ | 3.92 | $nd_8=1.48749$ | $\nu d_8=70.0$ |
| $r_{14}=$ | 147.059 | $d_{14}=$ | 10.78 | $nd_9=1.74077$ | $\nu d_9=27.7$ |
| $r_{15}=$ | −2237.872 | $d_{15}=$ | 25.49 | | |
| $r_{16}=$ | −196.078 | $d_{16}=$ | 4.41 | $nd_{10}=1.79504$ | $\nu d_{10}=28.4$ |
| $r_{17}=$ | 205.882 | $d_{17}=$ | 19.51 | $nd_{11}=1.51680$ | $\nu d_{11}=54.2$ |
| $r_{18}=$ | −100.000 | $d_{18}=$ | 0.49 | | |
| $r_{19}=$ | −237.142 | $d_{19}=$ | 3.92 | $nd_{12}=1.80537$ | $\nu d_{12}=25.5$ |
| $r_{20}=$ | 99.020 | $d_{20}=$ | 21.08 | $nd_{13}=1.51580$ | $\nu d_{13}=64.2$ |
| $r_{21}=$ | −91.313 | $d_{21}=$ | 0.49 | | |
| $r_{22}=$ | 2450.980 | $d_{22}=$ | 15.69 | $nd_{14}=1.51823$ | $\nu d_{14}=59.0$ |
| $r_{23}=$ | −145.800 | | | | |

4. A wide-angle photographic objective according to claim 1, wherein the numerical values of the radii $r_1$ to $r_{23}$ and of the thicknesses and separations $d_1$ to $d_{22}$, the refractive indices nd and the Abbe numbers $\nu d$ of the respective components are substantially as follows:

| Total focal length f-100mm Relative aperture 1:2.8 Angle of view 2ω = 94° | | | | | | | |
|---|---|---|---|---|---|---|---|
| $r_1=$ | 166.667 | $d_1=$ | 19.12 | $n_1=1.60327$ | $\nu d_1=60.7$ |
| $r_2=$ | 355.034 | $d_2=$ | 0.49 | | |
| $r_3=$ | 147.059 | $d_3=$ | 4.90 | $n_2=1.80454$ | $\nu d_2=39.5$ |
| $r_4=$ | 59.804 | $d_4=$ | 17.16 | | |
| $r_5=$ | 102.941 | $d_5=$ | 3.92 | $n_3=1.80454$ | $\nu d_3=39.5$ |
| $r_6=$ | 60.294 | $d_6=$ | 19.61 | | |
| $r_7=$ | 352.446 | $d_7=$ | 4.41 | $n_4=1.80186$ | $\nu d_4=44.4$ |
| $r_8=$ | 96.314 | $d_8=$ | 19.61 | $n_5=1.59507$ | $\nu d_5=35.6$ |
| $r_9=$ | −606.387 | $d_9=$ | 0.49 | | |
| $r_{10}=$ | 121.569 | $d_{10}=$ | 3.92 | $n_6=1.77279$ | $\nu d_6=49.4$ |
| $r_{11}=$ | 63.725 | $d_{11}=$ | 16.67 | | |
| $r_{12}=$ | 137.760 | $d_{12}=$ | 29.90 | $n_7=1.77279$ | $\nu d_7=49.4$ |
| $r_{13}=$ | −56.618 | $d_{13}=$ | 3.92 | $n_8=1.52000$ | $\nu d_8=70.1$ |
| $r_{14}=$ | 281.863 | $d_{14}=$ | 12.25 | $n_9=1.74077$ | $\nu d_9=27.7$ |
| $r_{15}=$ | −755.642 | $d_{15}=$ | 25.98 | | |
| $r_{16}=$ | −196.275 | $d_{16}=$ | 4.41 | $n_{10}=1.79668$ | $\nu d_{10}=45.4$ |
| $r_{17}=$ | 230.392 | $d_{17}=$ | 19.61 | $n_{11}=1.51714$ | $\nu d_{11}=64.2$ |
| $r_{18}=$ | −101.407 | $d_{18}=$ | 0.49 | | |
| $r_{19}=$ | −235.294 | $d_{19}=$ | 3.92 | $n_{12}=1.80537$ | $\nu d_{12}=25.5$ |
| $r_{20}=$ | 105.779 | $d_{20}=$ | 22.06 | $n_{13}=1.50153$ | $\nu d_{13}=56.5$ |
| $r_{21}=$ | −89.706 | $d_{21}=$ | 0.49 | | |
| $r_{22}=$ | 1960.784 | $d_{22}=$ | 15.69 | $n_{14}=1.58913$ | $\nu d_{14}=61.2$ |
| $r_{23}=$ | −169.466 | | | | |

5. A wide-angle photographic objective according to claim 1, wherein the numerical values of the radii $r_1$ to $r_{23}$ and of the thicknesses and separations $d_1$ to $d_{22}$, the refractive indices nd and the Abbe numbers $\nu d$ of the respective components are substantially as follows

| Total focal length f=100mm Relative aperture 1:2.8 Angle of view 2ω = 94° | | | | | | | |
|---|---|---|---|---|---|---|---|
| $r_1=$ | 173.824 | $d_1=$ | 18.63 | $n_1=1.60311$ | $\nu d_1=60.7$ |
| $r_2=$ | 406.863 | $d_2=$ | 0.49 | | |
| $r_3=$ | 147.794 | $d_3=$ | 4.41 | $n_2=1.79877$ | $\nu d_2=44.3$ |
| $r_4=$ | 62.500 | $d_4=$ | 17.16 | | |
| $r_5=$ | 107.843 | $d_5=$ | 3.92 | $n_3=1.78797$ | $\nu d_3=47.5$ |
| $r_6=$ | 56.373 | $d_6=$ | 20.59 | | |
| $r_7=$ | 267.745 | $d_7=$ | 4.41 | $n_4=1.79877$ | $\nu d_4=44.3$ |
| $r_8=$ | 107.843 | $d_8=$ | 19.61 | $n_5=1.53256$ | $\nu d_5=46.0$ |
| $r_9=$ | −606.387 | $d_9=$ | 0.49 | | |
| $r_{10}=$ | 116.667 | $d_{10}=$ | 3.92 | $n_6=1.73350$ | $\nu d_6=51.0$ |
| $r_{11}=$ | 61.814 | $d_{11}=$ | 17.16 | | |
| $r_{12}=$ | 136.569 | $d_{13}=$ | 29.90 | $n_7=1.74400$ | $\nu d_7=45.0$ |
| $r_{13}=$ | −54.922 | $d_{13}=$ | 3.92 | $n_8=1.51680$ | $\nu d_8=64.2$ |
| $r_{14}=$ | 294.118 | $d_{14}=$ | 10.78 | $n_9=1.62588$ | $\nu d_9=35.6$ |
| $r_{15}=$ | −357.059 | $d_{15}=$ | 25.98 | | |
| $r_{16}=$ | −195.108 | $d_{16}=$ | 4.41 | $n_{10}=1.78797$ | $\nu d_{10}=47.5$ |
| $r_{17}=$ | 215.608 | $d_{17}=$ | 19.61 | $n_{11}=1.51680$ | $\nu d_{11}=64.2$ |
| $r_{18}=$ | −100.000 | $d_{18}=$ | 0.49 | | |
| $r_{19}=$ | −237.142 | $d_{19}=$ | 3.92 | $n_{12}=1.80518$ | $\nu d_{12}=25.5$ |
| $r_{20}=$ | 104.588 | $d_{20}=$ | 21.08 | $n_{13}=1.50137$ | $\nu d_{13}=56.5$ |
| $r_{21}=$ | −90.907 | $d_{21}=$ | 0.49 | | |
| $r_{22}=$ | 4411.765 | $d_{22}=$ | 15.69 | $n_{14}=1.62299$ | $\nu d_{14}=58.1$ |
| $r_{23}=$ | −177.897 | | | | |

6. In a wide-angle photographic objective comprising a diaphragm, a front lens group positioned at the object side and a rear lens group positioned at the image side, the diaphragm being interposed between said lens groups, the improvement wherein the front lens group comprises a positive meniscus component having its surface convex to the object side, at least two negative meniscus lens components having their surfaces convex to the object side and at least one positive lens component, and wherein the rear lens group consists of, in the order from the object side, two meniscus lens components each having their surfaces convex to the image side and comprising a biconcave and a biconvex lens cemented together, and one position lens component.

7. A wide-angle photographic objective according to claim 6, wherein the front lens group comprises, in the order from the object side:
   a first component which is a positive meniscus lens convex to the object side;

a second component which is a negative meniscus lens convex to the object side;
a third component which is a negative meniscus lens convex to the object side;
a fourth component which is a positive lens;
a fifth component which is a negative meniscus lens convex to the object side; and
a sixth component which is a positive lens.

8. A wide-angle photographic objective according to claim 7, wherein in the rear lens group said meniscus lens components each having their surfaces convex to the image side and comprising a biconcave lens and a biconvex lens cemented together constitute the seventh and eighth components; and the positive lens constitutes the ninth component.

* * * * *